United States Patent [19]

Schwander

[11] 4,221,911
[45] Sep. 9, 1980

[54] NAPHTHOLACTAM DYESTUFFS

[75] Inventor: Hansrudolf Schwander, Riehen, Switzerland

[73] Assignee: Ciba-Geigy Corporation, Ardsley, N.Y.

[21] Appl. No.: 659,389

[22] Filed: Feb. 19, 1976

[30] Foreign Application Priority Data

Feb. 28, 1975 [CH] Switzerland ............... 2562/75

[51] Int. Cl.$^2$ ............... D06P 1/642; C07D 403/06; C07D 403/14; C07D 401/14
[52] U.S. Cl. ............... 544/354; 544/114; 8/574
[58] Field of Search ....... 260/250 Q, 250 QN, 326.27; 544/354, 114

[56] References Cited

U.S. PATENT DOCUMENTS

| 3,399,191 | 8/1968 | Brack | 260/250 Q |
| 3,927,005 | 12/1975 | Harnish | 260/294.8 |
| 4,159,379 | 6/1979 | Schwander | 544/354 |

OTHER PUBLICATIONS

Holmquist et al., J.A.C.S. 81, 3689 (1959).

Russel et al., J.A.C.S. 69, 11 (1947).

*Primary Examiner*—Mark L. Berch
*Attorney, Agent, or Firm*—Prabodh I. Almaula

[57] ABSTRACT

Naphtholactam dyes of formula

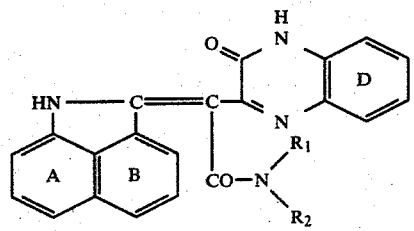

wherein the cyclic and acyclic radicals can carry non-ionogenic substituents, the ring D can additionally be fused to a benzene ring, and $R_1$ and $R_2$ are hydrogen atoms or substituted or unsubstituted hydrocarbon radicals which together are also able to form a hydrocarbon chain which is optionally interrupted by heteroatoms, dyestuffs, dye polyester fibre in fast yellow and red shade.

7 Claims, No Drawings

NAPHTHOLACTAM DYESTUFFS

The present invention provides a process for dyeing hydrophobic textile material, in particular material made from regenerated man-made and synthetic fibres which contain ester groups, which comprises the use of the dyes of formula (I)

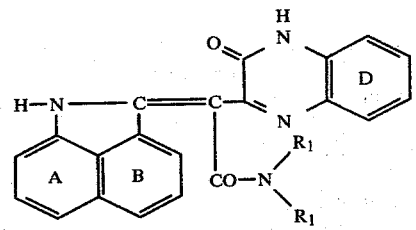

(I)

wherein the cyclic and acyclic radicals can carry non-ionogenic substituents, the ring D can additionally be fused to a benzene ring, and $R_1$ and $R_2$ are hydrogen atoms or substituted or unsubstituted hydrocarbon radicals, which together are also able to form a ring which is optionally interrupted by heteroatoms.

The dyes of the present invention are obtained by reacting a naphtholactam of formula (II)

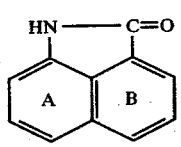

(II)

with a substituted acetic ester which contains active methylene groups of formula (III)

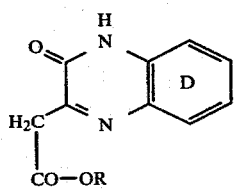

(III)

in the presence of an acid condensation agent, for example phosphoroxy chloride, at elevated temperature, to give the dye of formula (IV)

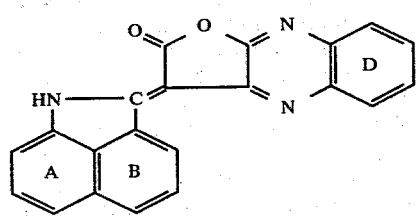

(IV)

and subsequently splitting the lactone ring by aminolysis with an amine of formula

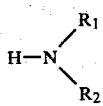

wherein the symbols A, B, D, $R_1$ and $R_2$ are as defined hereinbefore.

The dyes of formula (I) are new and they themselves and the process for their manufacture, both from the naphtholactams and in particular the manufacture by aminolysis of the dyes of formula (V), likewise constitute objects of the present invention.

Examples of non-ionogenic substituents at the rings A and B are: alkyl, alkoxy, halogen, nitro, alkylmercapto, alkylsulphonyl, arylsulphonyl, acylamino, cyano, carboxy amide and sulphonamide. By alkyl groups are meant in particular those containing 1 to 4 carbon atoms, for example methyl, ethyl, isopropyl and n-butyl; and by alkoxy groups are meant in particular those containing 1 to 4 carbon atoms, for example methoxy, ethoxy, n-propoxy, n-butoxy and isopropoxy. Halogen atoms are, besides fluorine, in particular chlorine and bromine. Alkylmercapto and alkylsulphonyl groups are in particular those containing 1 to 4 carbon atoms in the alkyl moiety, for example methylmercapto or methylsulphonyl, β-hydroxyethylmercapto or β-hydroxyethylsulphonyl, isopropylmercapto or iso-propylsulphonyl or n-butylmercapto or n-butylsulphonyl groups. By arylsulphonyl groups are meant in particular phenylsulphonyl groups and by aralkylsulphonyl preferably benzylsulphonyl groups. By acylamino is meant in particular alkylcarbonylamino groups containing 1 to 4 carbon atoms in the alkyl moiety, such as acetylamino and alkylsulphonylamino of 1 to 4 carbon atoms, for example methylsulphonylamino. By carboxy amide and sulphonamide groups are meant in particular those which are substituted by alkyl radicals of 1 to 4 carbon atoms, for example methyl, ethyl, n-butyl.

As examples of non-ionogenic substituents at the ring D there may be cited: alkyl, alkoxy, alkylmercapto, halogen, cyano, carboalkoxy, cycloalkyl, aralkyl, aryloxy, arylmercapto, phenyl, alkylsulphonyl, phenylsulphonyl, sulphonamide. Alkyl is to be understood in this connection as meaning in particular alkyl groups of 1 to 4 carbon atoms, such as methyl, ethyl, β-cyanoethyl, n-propyl, isopropyl and n-butyl groups as well as trifluoromethyl groups. By alkoxy, halogen, alkylsulphonyl and sulphonamide are meant in particular those groups and atoms which have been cited as suitable for rings A and B. Cycloalkyl is in particular the cyclohexyl radical and aralkyl is to be understood as meaning in particular phenylalkylene radicals of 1 to 3 carbon atoms.

Particularly useful dyes are those that contain no water-solubilising groups and have the formula

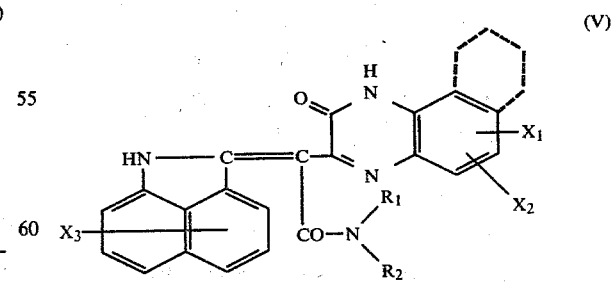

(V)

wherein $X_1$ represents hydrogen, substituted or unsubstituted alkyl, substituted or unsubstituted alkoxy, substituted or unsubstituted phenoxy, substituted or unsubstituted thiophenoxy, substituted or unsubstituted S-alkyl, halogen, preferably bromine or chlorine, COOR, in which R represents substituted or unsubstituted alkyl,

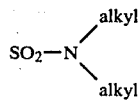

(alkyl being in each case substituted or unsubstituted), —SO$_2$-alkyl (in which alkyl is substituted or unsubstituted) or CN, X$_2$ represents methoxy, ethoxy, methyl or preferably hydrogen, X$_3$ represents hydrogen, alkyl containing preferably up to 4 carbon atoms, chlorine, bromine,

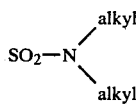

(alkyl being in each case substituted or unsubstituted), nitro, SO$_2$—R, in which R represents alkyl, substituted or unsubstituted phenyl, and alkoxy, and the dotted ring can represent a fused benzene ring, and R$_1$ and R$_2$ are as defined hereinbefore, possible heteroatoms being preferably oxygen, sulphur or nitrogen atoms.

The substituted or unsubstituted alkoxy and alkyl groups cited hereinabove contain preferably not more than 4 carbon atoms. They are also referred to hereinafter as lower alkyl and lower alkoxy groups.

The alkyl groups which can be present in the radicals X$_1$, X$_2$ and X$_3$ can be unsubstituted or substituted by alkoxy of 1 to 4 carbon atoms, chlorine, bromine, cyano, carboxyl, carbalkoxy of 1 to 4 carbon atoms, sulpho, carboxy amide or acetoxy, for example, methyl, ethyl, β-cyanoethyl, β-chloroethyl, β-hydroxyethyl, β-hydroxypropyl, β-hydroxy-γ-chloropropyl, β-carboxyethyl, β-carbomethoxyethyl, β-carboethoxyethyl or β-carbobutoxyethyl, β-carbonamidoethyl, β-acetoxyethyl.

Particularly preferred dyes are those of formulae

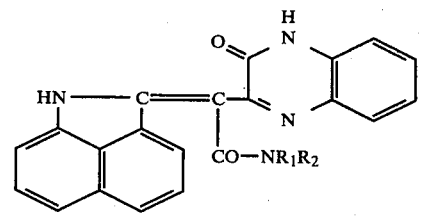

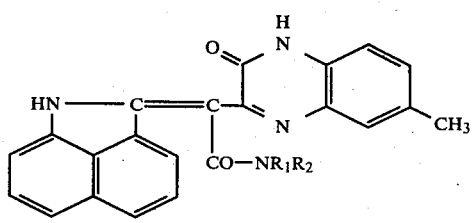

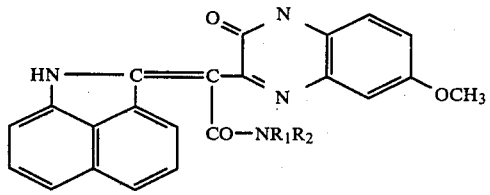

wherein R$_1$ and R$_2$ are as defined hereinbefore.

Water-solubilising groups are primarily sulphonic acid groups and groups with positively charged (quaternary) nitrogen atoms. Free carboxyl groups (—COOH) are normally classified among the water-solubilising groups, but as a rule they effect solubility in water only in the form of their salts, for example the alkali salts, so that their exclusion constitutes only a preferred embodiment.

By an optionally substituted hydrocarbon radical, and by aryl, aralkyl, cycloalkyl and aliphatic radicals are meant preferably radicals of the benzene series, benzyl, phenethyl, cyclohexyl or alkyl radicals of at most 12 carbon atoms, which latter can be interrupted by oxygen or sulphur atoms or imino groups. The radicals R located at the same nitrogen atom can be attached to each other direct or through heteroatoms, in particular oxygen and sulphur atoms. R$_1$ and R$_2$ together with the nitrogen atom can therefore form, for example, a piperidine, pyrrolidine or morpholine radical.

The radicals R$_1$ and R$_2$ are, for example, methyl, ethyl, propyl, isopropyl, butyl, sec. butyl, n-pentyl and octyl radicals, which can be interrupted by oxygen atoms and substituted by hydroxy, carboxyl, carbalkoxy (of 2 to 6 carbon atoms), alkoxy (of 1 to 8 carbon atoms), phenoxy, acyloxy (of 1 to 10 carbon atoms) groups, phenyl groups which are unsubstituted or substituted by halogen atoms, lower alkyl or lower alkoxy groups, β-hydroxyethyl or lower carboalkoxy groups, or by benzyl or phenethyl or cyclohexyl groups, or together are attached to a piperidine, pyrrolidine, morpholine, piperazine or methylpiperazine ring.

Examples of possible acyl radicals are fatty acid radicals containing up to 5 carbon atoms, for example formyl, acetyl, propionyl, butyl radicals; alkylcarbamyl radicals of 1 to 5 carbon atoms, for example methylaminocarbonyl, ethylaminocarbonyl, propylaminocarbonyl or butylaminocarbonyl radicals; alkyloxycarbonyl radicals containing up to 5 carbon atoms, for example methoxycarbonyl, ethoxycarbonyl, propoxycarbonyl or butoxycarbonyl radicals; phenylcarbamyl or phenoxycarbonyl radicals, benzoxyl, phenoxyacetyl, chloroacetyl or phenylacetyl radicals.

Where each of R$_1$ and R$_2$ represents an alkyl radical, this can contain up to 8, preferably 1 to 4, carbon atoms, and is straight-chain or branched. If the alkyl radical is substituted, possible substituents are, for example, the hydroxyl group or lower alkoxy groups, such as the methoxy group, the cyano group, or halogens, for example chlorine or bromine. As cycloalkyl or phenylalkyl groups, R$_1$ and R$_2$ represent, for example, the cyclohexyl or the benzyl group.

A phenyl radical represented by R$_1$ or R$_2$ can be substituted by non-ionogenic substituents, for example by cyano groups, lower alkyl or lower alkoxy groups, by the phenoxy group, by lower alkanoyl, lower carbalkoxy, lower alkylsulphonyl, lower alkylsulphonyloxy, lower alkanoylamino or lower alkylsulphonylamino groups, unsubstituted carboxy amide and sulphonamide groups, by lower alkyl, hydroxyalkyl, alkoxyalkyl or cyanoalkyl groups, N-monosubstituted or N,N-disubstituted carboxy amide or sulphonamide groups, or by halogens, for example fluorine, chlorine or bromine.

Where one of the substituents $R_1$ and $R_2$ represents a phenyl radical which is substituted by non-ionogenic substituents, the preferred substituents are, for example, halogens, such as fluorine, chlorine or bromine, lower alkyl or alkoxy groups.

Examples of primary and secondary amines which are suitable for the aminolysis are:
methylamine,
dimethylamine,
2-cyanoethylamine,
ethylamine,
diethylamine,
bis-(2-cyanoethyl)-amine,
ethanolamine,
diethanolamine,
propylamine,
ethyleneimine,
butylamine,
N,N-dimethylpropylenediamine(1,3),
dibutylamine,
cyclohexylamine,
N-methylaniline,
benzylamine,
4-(methyl-, chloro- or nitro)-benzylamine,
bis-(2-methoxyethyl)-amine,
diisopropylamine,
N-methylpiperazine,
N-hydroxyethylpiperazine,
aniline,
N-methylaniline,
3-chloro-4-methylaniline,
pyrrolidine,
diphenylamine,
piperidine,
2-aminopyridine,
morpholine,
8-aminoquinoline,
2-aminothiazole,
o-, m-, p-chloroaniline,
o-, m-, p-toluidine,
o-, m-, p-nitroaniline,
o-, m-, p-phenetidine,
1-, 2-aminonaphthalene,
p-aminobenzoic methyl ester,
2-aminobenzthiazole,
2-aminothiazole,
α- and β-tetrahydrofurfurylamine,
α- and β-tetrahydrofurfuryl-N-methylamine,
N-(α-tetrahydroxypyranylmethyl)-N-methylamine,
α-tetrahydropyranyl-N-methylamine,
3-aminosulpholane,
1-carboethoxy-2-amino-thiophene,
2-amino-3-carboethoxy-4-methyl-thiophene and
3-amino-pyridine.

The aminolysis is carried out by reaction with the primary or secondary amines referred to hereinbefore, using either an excess or an equimolar amount thereof. The reaction is carried out preferably at elevated temperature, at 40° to 200° C., desirably at 50° C. to 120° C. It is advantageous to carry out the process in the presence of customary organic solvents, for example alcohols, ethers, aromatic hydrocarbons etc.

The reaction of the naphtholactam of formula (II) with the acetic ester of formula (III) which contains active methylene groups takes place in the presence of an acid condensation agent, for example phosphoroxy bromide, phosphoroxy trichloride, phosphorus tribromide, phosphorus pentachloride, thionyl chloride, phosgene (in an autoclave), or mixtures of phosphoroxy chloride and phosphorus pentoxide, especially, however, in the presence of phosphoroxy chloride.

The reaction takes place advantageously at elevated temperature, for example at temperatures from 50° to 200° C., but preferably in the range from 60° to 130° C. It is advantageously carried out in an inert organic solvent, such as benzene, toluene, xylene, chlorobenzene, dichlorobenzene, nitrobenzene, ethylene chloride, carbon tetrachloride or chloroform. The naphtholactam compounds of formula (II) used as starting materials are known. As examples there may be cited: naphtholactam-(1.8), 4-methoxy-naphtholactam-(1.8), 4-bromo-naphtholactam-(1.8), 4-chloro-naphtholactam-(1.8), 2,4-dichloro-naphtholactam-(1.8), 4-nitro-naphtholactam-(1.8), 4-methylsulphonyl-naphtholactam-(1.8), 4-morpholinosulphonyl-naphtholactam-(1.8), 4-methylmercapto-naphtholactam-(1.8), 4-sulpho-naphtholactam-(1.8), 2-methyl-naphtholactam-(1.8).

The starting materials of formula (III) are obtained by condensing phenylenediamines of formula (VI)

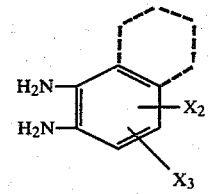

wherein $X_2$ and $X_3$ and the dotted ring have the meanings previously assigned to them, with oxalacetic ester of formula (VII)

RO—OC—CO—CH$_2$—CO—COOR (VII)

wherein R preferably represents a lower alkyl group. The condensation product can be illustrated by the formula

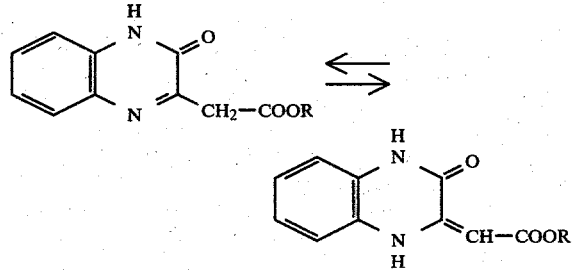

Suitable diamines are:
o-phenylenediamine
1,2-diamino-4-methylbenzene
1,2-diamino-3-methylbenzene
1,2-diamino-4,6-dimethylbenzene
1,2-diamino-4-cyanobenzene
1,2-diamino-4-methoxybenzene 1,2-diamino-3-methoxybenzene
1,2-diamino-4-acetylaminobenzene
1,2-diamino-(3- or 4-)-ethoxybenzene
1,2-diamino-(3- or 4)-propoxybenzene
1,2-diamino-3- or 4-(1,2-epoxypropoxy)-benzene
1,2-diamino-4-nitrobenzene
1,2-diamino-4-chloro-5-ethoxybenzene
1,2-diamino-naphthalene
1,2-diamino-4-chlorobenzene
1,2-diamino-4-bromobenzene
1,2-diamino-4-N-(ethyl-, $\beta$-hydroxyethyl)- or $\beta$-acyloxyethyl)-benzene or
1,2-diamino-4-N,N-diethylaminobenzene.

Suitable oxalylacetic esters are above all the lower alkyl ester.

The dyes of formula (I) yield brilliant, luminous golden yellow to red dyeings, which fluoresce as a rule in ultra-violet light and possess outstanding fastness properties. The dyes which do not contain water-solubilising groups are particularly useful.

The new dyestuffs are suitable for dyeing hydrophobic regenerated man-made and synthetic man-made fibres, for example acrylic or acrylonitrile fibres, polyacrylonitrile fibres and copolymers of acrylonitrile and other vinyl compounds, such as basically modified polypropylene, polypropylene modified with nickel or unmodified polypropylene, cellulose triacetate and cellulose 2½-acetate, and especially fibres of polyamides, such as nylon 6, nylon 6 6 or nylon 12, and of aromatic polyesters, such as those of terephthalic acid and ethylene glycol or 1,4-dimethylolcyclohexane and copolymers of terephthalic acid and isophthalic acid with ethylene glycol.

The dyeing of the above mentioned fibre materials, in particular those derived from polyester, with the dyes according to the invention which are sparingly soluble in water, is carried out preferably from aqueous dispersion at temperatures above 100° C. It is appropriate, therefore, to finely divide the compounds suitable for use as disperse dyes by grinding them with textile assistants, for example dispersants, and possibly with other grinding assistants. By subsequent drying, dyestuff preparations are obtained consisting of textile assistant and the dye.

Examples of dispersants of the non-ionic group that can be used with advantage are: addition products of 8 moles of ethylene oxide with 1 mole of p-tert.-octylphenol, of 15 or 6 moles of ethylene oxide with castor oil, of 20 moles of ethylene oxide with the alcohol $C_{16}H_{33}OH$, ethylene oxide addition products with di-[$\alpha$-phenylethyl]-phenols, polyethylene oxide-tert.-dodecyl-thioether, polyamine-polyglycol ether or addition products of 15 or 30 moles of ethylene oxide with 1 mole of the amine $C_{12}H_{25}NH_2$ or $C_{18}H_{37}NH_2$.

As anionic dispersants there may be mentioned: sulphuric acid esters of alcohols of the fatty series containing 8 to 20 carbon atoms, of the ethylenoxy adducts of the corresponding fatty acid amides, or of alkylated phenols containing 8 to 12 carbon atoms in the alkyl moiety: sulphonic acid esters with alkyl radicals containing 8 to 20 carbon atoms; sulphation products of unsaturated fats and oils; phosphoric acid esters containing 8 to 20 carbon atoms; fatty acid soaps, also alkylaryl sulphonates, condensation products of formaldehyde with naphthalenesulphonic acid and lignin sulphonates.

Suitable cationic dispersants are quaternary ammonium compounds that contain alkyl or aralkyl radicals of 8 to 20 carbon atoms.

In addition to containing the dispersants, the dyestuff preparations can contain organic solvents, especially solvents that boil above 100° C., which are preferably miscible with water, such as mono- and dialkylglycol ether, dioxan, dimethyl formamide or dimethyl acetamide, tetramethylenesulphone or dimethyl sulphoxide. Dye, dispersant and solvent can with advantage be ground together.

Such a dyestuff preparation is obtained, for example, by working 2 to 30, preferably 5 to 20, percent by weight of the dispersant with 10 to 55 percent by weight, preferably about two to four times the amount, of dye, and about 10 to 20 parts of a glycol or of another water retardant, into a paste. The pH is then adjusted to about 9 with a dilute acid, preferably with sulphuric or acetic acid, and the paste is then bulked with water to 100%. The mixture is subsequently ground to the required degree of fineness, for example in a glass bead mill or another dispersing machine, at a temperature between 20° and 90° C.

The polyester fibres are dyes from aqueous dispersion with the dyes according to the invention, which are sparingly soluble in water, according to the conventional processes for polyester material. Polyesters of aromatic polycarboxylic acids with polyhydric alcohols are dyed preferably at temperatures of over 100° C. under pressure. However, the dyeing can also be carried out at the boiling point of the dye bath in the presence of dyestuff carriers, for example phenylphenols, polychlorobenzene compounds or similar assistants, or by the thermosol process, that is to say padding with subsequent after-treatment with the application of heat, for example thermofixing, at 180°–210° C. Cellulose 2½-acetate fibres are dyed preferably at temperatures of 80°–85° C., whereas cellulose triacetate fibres are dyed advantageously at the boiling point of the dye bath. The use of dyestuff carriers is superfluous in dyeing cellulose 2½-acetate or polyamide fibres. The dyes according to the invention can also be used for printing the materials mentioned according to conventional methods.

The dyeings obtained according to the process of the present invention can be subjected to an aftertreatment, for example by heating with an aqueous solution of an ion-free detergent.

According to the process of the present invention, the cited compounds can also be applied by printing instead of by impregnating. This is accomplished by using, for example, a printing ink which contains the finely dispersed dye in addition to the customary assistants used in the printing industry, such as wetting agents and thickeners.

Furthermore, it is possible to dye, for example, synthetic fibres, such as polyesters and polyamides, in organic solvent liquors, for example a mixture of perchloroethylene and dimethyl formamide or in pure perchloroethylene.

According to the process of the present invention, strong, brilliant dyeings and prints with excellent fastness properties are obtained, especially fastness to light, thermofixation, sublimation, pleating, exhaust gas, cross-dyeing, dry-cleaning, ironing, rubbing, chlorine, and good wet fastness properties, for example fastness to water, washing and perspiration.

It is also possible to use the new water-insoluble dyes for the spin dyeing of polyamides, polyesters and polyolefins. The polymers to be dyed are advantageously in the form of powder, grains or chips, as ready prepared spinning solution or mixed in the fused state with the dye, which is introduced in the dry state or in the form of a dispersion or solution in an optionally volatile solvent. After the dye has been uniformly distributed in the solution or the melt of the polymer, the mixture is processed in known manner by pouring, moulding or extruding to fibres, yarns, monofilaments, films and the like.

The dyes of the present invention are preeminently suitable for colouring oils of macromolecular materials such as varnishes, films, sheets and mouldings, for example those of cellulose esters, such as cellulose 2½-acetate and cellulose triacetate, polyvinyl compounds, such as polyvinyl chloride, polyvinyl acetate; polyurethanes; polystyrene, polyesters, polyamides and polycarbonates in the melt/spinning solution.

The dyes of the present invention are also very suitable for the high temperature and thermosol processes, as well as for the permanent press finish ("Korotron" process). They are also suitable for printing.

The invention is illustrated by the following Examples, in which the parts and percentages are by weight unless otherwise indicated.

EXAMPLE 1

A mixture consisting of 7.65 g of the dye of formula

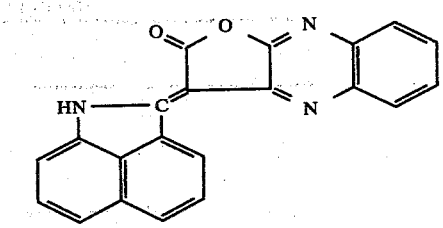

8.50 g of piperidine and 30 ml of chlorobenzene is stirred for 1 hour at 125° C. After the mixture was cooled, the precipitate of the new dye of formula

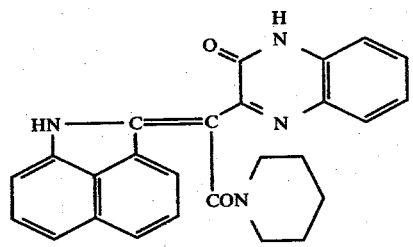

is filtered off and washed with chlorobenzene and then with methanol. The resultant dye colours polymethylene glycol terephthalate red when applied as a disperse dye. The dyeings are of good fastness to light and sublimation. By carrying out the same procedure, but using either the above starting dye or a corresponding substituted dye, and instead of piperidine the amines listed in column I of the following table, the corresponding dyes of column II are obtained in analogous manner by aminolysis.

| Ex. No. | I | II | Shade on Polyester |
|---|---|---|---|
| 1 | H—⌬—NH—CH₃ | (structure) | red |
| 2 | " | (structure) | red |

-continued

| Ex. No. | I | II | Shade on Polyester |
|---|---|---|---|
| 3 | " | (structure with OCH₃, CH₃, cyclohexyl-H, naphthyl-NH) | red |
| 4 | " | (structure with OC₂H₅, CH₃, cyclohexyl-H, naphthyl-NH) | red |
| 5 | ⌬—NH—C₂H₅ | (structure with C₂H₅, cyclohexyl-H, naphthyl-NH) | red |
| 6 | " | (structure with CH₃, C₂H₅, cyclohexyl-H, naphthyl-NH) | red |
| 7 | " | (structure with OCH₃, C₂H₅, cyclohexyl-H, naphthyl-NH) | red |
| 8 | " | (structure with OC₂H₅, C₂H₅, cyclohexyl-H, naphthyl-NH) | red |

-continued
| Ex. No. | I | II | Shade on Polyester |
|---|---|---|---|
| 9 | 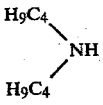 | 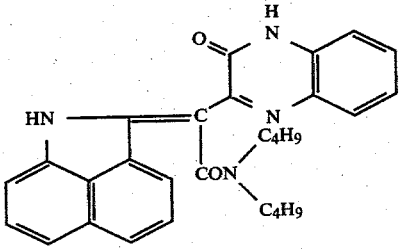 | red |
| 10 | " | 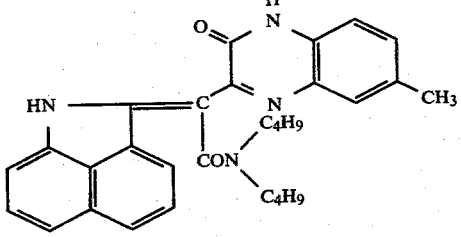 | red |
| 11 | " | 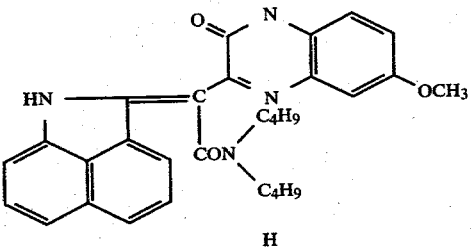 | red |
| 12 | " | 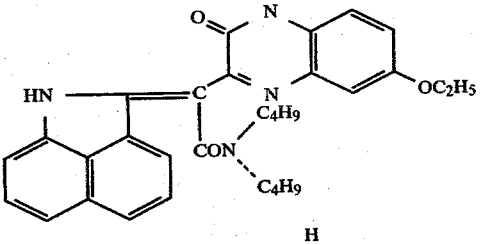 | red |
| 13 | 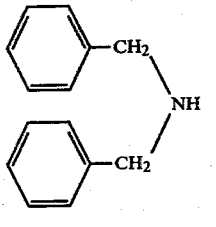 | 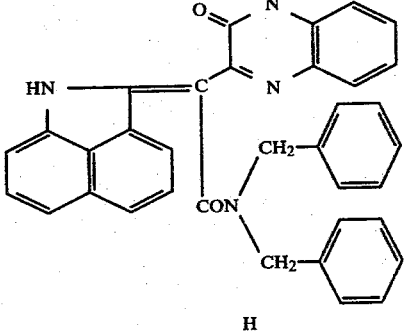 | red |
| 14 | " | 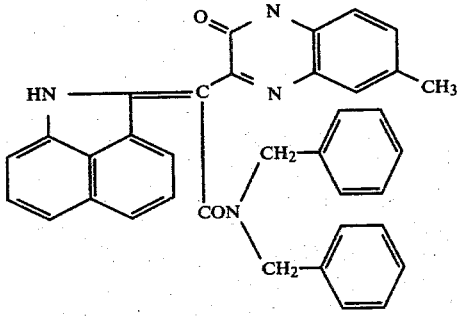 | red |

| Ex. No. | I | II | Shade on Polyester |
|---|---|---|---|
| 15 | " | (structure) | red |
| 16 | H₁₇C₈\HN/H₁₇C₈ | (structure) | red |
| 17 | " | (structure) | red |
| 18 | " | (structure) | |

EXAMPLE 2

The starting dyes are obtained as follows: At a temperature of 100° C., 8.75 g of phosphoroxy chloride are added dropwise in the course of 30 minutes to a mixture containing 8.50 g of naphthostyril and 11.60 g of the compound of formula

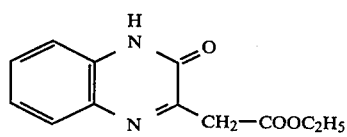

in 75 ml of chlorobenzene, and the reaction mixture is subsequently stirred for 15 minutes at the same temperature. The reaction mixture is then allowed to cool and the precipitate which has formed is filtered off at 30° C. and mixed with chlorobenzene. The precipitate is then suspended in 100 ml of chlorobenzene and 4 ml of pyridine are added, so that the mixture shows neutral reaction. After the mixture has been stirred for 30 minutes at room temperature the dye is filtered off and washed firstly with chlorobenzene and then with methanol, to yield the dye of the formula

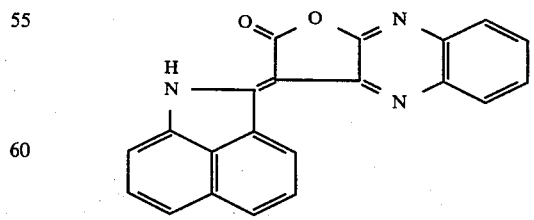

in the form of a brick-red powder which dissolves in dimethyl formamide in a bluish red colour.

By repeating the above procedure, but using instead of the above heterocyclic compound an equivalent amount of the mixture of the compounds

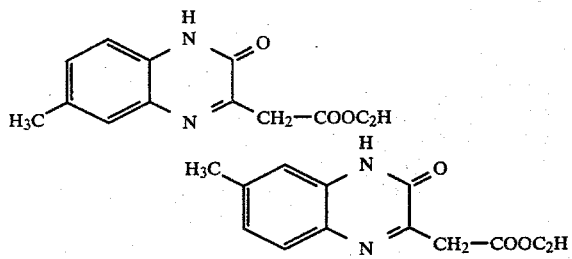

(obtained by reacting 4-methyl-1,2-phenylenediamine with oxalacetic ester), a mixture of the dyes of the formulae

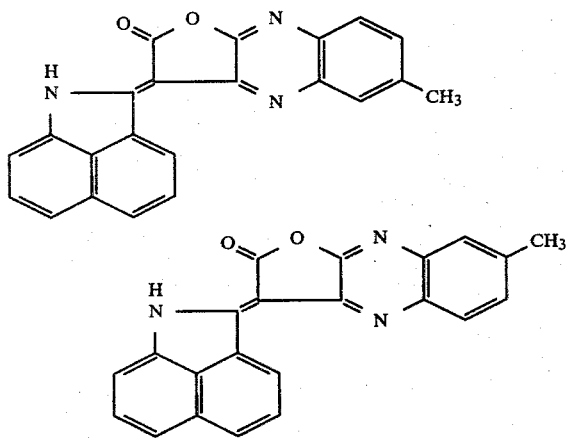

is obtained, which is likewise used as starting product for the aminolysis.

EXAMPLE 3

2 g of the dye obtained in Example 1 are dispersed in 4000 g of water. To this dispersion are added as swelling agent 12 g of the sodium salt of o-phenylphenol and 12 g of diammonium phosphate and 100 g of polyethylene glycol terephthalate yarn is dyed therein for 1½ hours at 95°–98° C. The dyed yarn is rinsed and given an aftertreatment with aqueous sodium hydroxide and a dispersant. A red dyeing which is fast to washing, light and sublimation is obtained. A red dyeing which has very good fastness to washing and sublimation is obtained by substituting 100 g of cellulose triacetate fabric for the 100 g of polyethylene glycol terephthalate, dyeing under the same conditions, and subsequently rinsing the dyed fabric with water.

EXAMPLE 4

In a pressure dyeing apparatus, 2 g of the dye obtained in Example 1 are finely suspended in 2000 g of water which contains 4 g of oleyl polyglycol ether. The pH of the dyebath is adjusted to 4–5 with acetic acid. Then 100 g of polyethylene glycol terephthalate fabric are put at 50° C. into this bath, which is heated to 140° C. in the course of 30 minutes and dyeing is performed for 50 minutes at this temperature. The dyed fabric is subsequently rinsed with water, soaped and dried. A scarlet red dyeing which is fast to washing, perspiration, light and sublimation is obtained under these conditions. The dyes described in the other Examples effect dyeings of equal quality by carrying out this procedure.

EXAMPLE 5

Polyethylene glycol terephthalate fabric is impregnated on a padder at 40° C. with a liquor of the following composition:
20 g of the dye obtained in Example 1 finely dispersed in 7.5 g of sodium alginate,
20 g of triethanolamine,
20 g of octylphenol polyglycol ether and 900 g of water.

The fabric, which is squeezed out to a pick-up of app. 100%, is dried at 100° C. and subsequently fixed for 30 seconds at a temperature of 210° C. The dyed goods are rinsed with water, soaped and dried. A red dyeing which is fast to washing, rubbing, light and sublimation is obtained under these conditions.

The dyes described in the other Examples effect dyeings of equal quality by carrying out this procedure.

I claim:

1. A dye of the formula

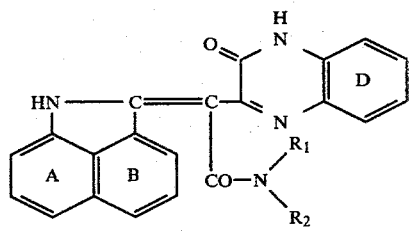

wherein
rings A and B are unsubstituted or monosubstituted or identically disubstituted by unsubstituted or substituted alkyl of 1 to 4 carbon atoms substituted by alkoxy of 1 to 4 carbon atoms, chlorine, bromine, cyano, carboxyl, carbolkoxy of 1 to 4 carbon atoms, sulpho, carboxamido or acetoxy, alkoxy of 1 to 4 carbon atoms, halogen, nitroalkylmercapto of 1 to 4 carbon atoms in the alkyl moiety, alkylsulphonyl of 1 to 4 carbon atoms in alkyl moiety, phenylsulphonyl, benzylsulphonyl, alkylcarbonylamino of 1 to 4 carbon atoms in the alkyl moiety, alkylsulphonylamino of 1 to 4 carbon atoms, cyano, carboxamido or sulphonamido N-substituted by alkyl radicals of 1 to 4 carbon atoms, ring D is unsubstituted or monosubstituted or identically disubsituted by unsubstituted or substituted alkyl or 1 to 4 carbon atoms substituted by alkoxy of 1 to 4 carbon atoms, chlorine, bromine cyano, carboxyl, carbalkoxy of 1 to 4 carbon atoms, sulpho, carboxamido or acetoxy, alkoxy of 1 to 4 carbon atoms, alkylmercapto of 1 to 4 carbon atoms in the alkyl moiety, halogen cyano, carboalkoxy, cyclohexyl phenylalkylene of 1 to 3 carbon atoms, phenyl, phenoxy, alkylsulphonyl of 1 to 4 carbon atoms in the alkyl moiety, phenylsulphonyl, or sulphonamido N-substituted by alkyl radicals of 1 to 4 carbon atoms, the ring D can additionally be fused to a benzene ring, and $R_1$ and $R_2$ are hydrogen atoms or unsubstituted or substituted $C_1$–$C_8$-alkyl substituted by hydroxy, carboxyl, cyano, halogen, carbalkoxy of 2 to 6 carbon atoms, alkoxy of 1 to 8 carbon atoms, phenoxy or acyl of a fatty acid radical containing up to 5 carbon atoms, alkylcarbamyl of 1 to 5 carbon atoms, alkyloxycarbonyl containing up to 5 carbon atoms, phenylcarbamyl, phenoxycarbonyl, benzoxyl, phenoxyacetyl, chloroacetyl or phenylacetyl, or phenyl unsubstituted or substituted by halogen, lower alkyl, lower alkoxy, β-hydroxyethyl, lower carboalkoxy, benzyl, phenethyl or cyclohexyl or together form a piperidine, pyrrolidine, morpholine, piperazine or methylpiperazine ring.

2. The dye according to claim 1, of the formula

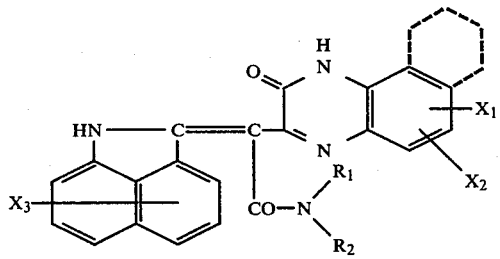

wherein $x_1$ represents hydrogen, alkyl, alkoxy, phenoxy, or S-alkyl, halogen, COOR in which R represents alkyl,

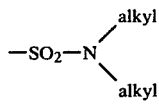

—SO₂-alkyl or CN, $X_2$ represents methoxy, ethoxy, methyl or hydrogen, $X_3$ represents hydrogen, alkyl containing up to 4 carbon atoms, chlorine, bromine,

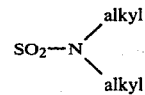

nitro, or SO₂-R, wherein R represents alkyl or phenyl, and the dotted ring can represent a fused benzene ring, and $R_1$ and $R_2$ are as defined in claim 1, said alkyl of $x_1$ and $x_3$ being in all occurences of 1 to 4 carbon atoms and said substituted alkyl of $x_1$ and $x_3$ being substituted by alkoxy of 1 to 4 carbon atoms, chlorine, bromine, cyano, carboxyl, carbalkoxy of 1 to 4 carbon atoms, sulfo, carboxamido or acetoxy.

3. The dye according to claim 2, wherein $X_1$ and $X_2$ are hydrogen atoms or alkyl or alkoxy radicals and $X_3$ is a hydrogen atom.

4. The dye according to claim 3, wherein $X_1$ is a methyl group or a lower alkoxy group.

5. The dye according to claim 2, wherein $X_2$ represents hydrogen.

6. The dye according to claim 1, wherein $R_1$ and $R_2$ represents unsubstituted or substituted $C_1$-$C_4$-alkyl substituted by hydroxy, lower alkoxy, cyano, or halogen.

7. The dye according to claim 2, wherein $R_1$ and $R_2$ together represents a piperidine, pyrrolidine, morpholine, piperizine or methylpiperizine ring.

* * * * *